(12) United States Patent
Mashburn

(10) Patent No.: US 7,252,503 B2
(45) Date of Patent: Aug. 7, 2007

(54) WIND-PROOF VENTURI TUBE

(75) Inventor: James S. Mashburn, Lakewood, CA (US)

(73) Assignee: Magma Products, Inc., Lakewood, CA (US)

( * ) Notice: Subject to any disclaimer, the term of this patent is extended or adjusted under 35 U.S.C. 154(b) by 39 days.

(21) Appl. No.: 11/063,787

(22) Filed: Feb. 23, 2005

(65) Prior Publication Data

US 2006/0051719 A1  Mar. 9, 2006

Related U.S. Application Data

(63) Continuation-in-part of application No. 10/934,978, filed on Sep. 3, 2004.

(51) Int. Cl.
 *F23D 14/62* (2006.01)
(52) U.S. Cl. ............................. 431/114; 431/354
(58) Field of Classification Search ............. 431/109, 431/110, 114, 354, 355, 350; 126/39 K, 126/85 R, 85 B, 91 A
See application file for complete search history.

(56) References Cited

U.S. PATENT DOCUMENTS

| | | | | |
|---|---|---|---|---|
| 593,342 A | * | 11/1897 | Volger et al. ............... 431/110 |
| 613,871 A | * | 11/1898 | Webb ......................... 431/110 |
| 778,712 A | * | 12/1904 | Salo .......................... 431/110 |
| 822,871 A | * | 6/1906 | Shoob ........................ 431/109 |
| 852,538 A | * | 5/1907 | Billow ....................... 431/355 |
| 978,133 A | * | 12/1910 | Brooks ....................... 431/109 |
| 987,459 A | * | 3/1911 | Harrison et al. ............ 431/355 |
| 2,577,772 A | * | 12/1951 | Kennedy ..................... 431/347 |
| 2,759,472 A | * | 8/1956 | Cartter ....................... 126/91 R |
| 2,859,332 A | * | 11/1958 | Townsend et al. .......... 362/179 |
| 3,162,239 A | * | 12/1964 | Irons .......................... 431/175 |
| 3,234,930 A | * | 2/1966 | Hodges ..................... 126/90 R |
| 3,311,155 A | * | 3/1967 | Hershey et al. ............. 431/114 |
| 3,421,482 A | * | 1/1969 | Ortega ....................... 122/264 |
| 3,614,948 A | * | 10/1971 | Jackson et al. ............. 126/85 B |
| 3,684,424 A | * | 8/1972 | Zink et al. .................. 431/114 |
| 3,907,489 A | * | 9/1975 | Santisi ....................... 431/114 |
| 3,934,572 A | * | 1/1976 | Teague, Jr. ................. 126/92 B |
| 4,128,389 A | * | 12/1978 | Straitz, III .................. 431/202 |
| 4,317,441 A | * | 3/1982 | Berg .......................... 126/41 R |
| 4,788,962 A | * | 12/1988 | Mashburn et al. ......... 126/25 R |
| 5,092,313 A | * | 3/1992 | Blackburn et al. ......... 126/512 |
| 6,125,838 A | * | 10/2000 | Hedgpeth .................. 126/41 R |

* cited by examiner

*Primary Examiner*—Carl D. Price
(74) *Attorney, Agent, or Firm*—Fulwider Patton LLP

(57) ABSTRACT

A venturi tube has a configuration of baffles affixed thereto that serve to greatly reduce the susceptibility of a gas burning appliance to wind gusts. The baffles cooperate to force incoming primary combustion air through a circuitous route before introduction into a flow of gaseous fuel. The circuitous route in combination with the volume of air that is contained within the baffling serves to substantially reduce flame blowout.

8 Claims, 2 Drawing Sheets

WIND-PROOF VENTURI TUBE

This is a continuation-in-part of U.S. patent application Ser. No. 10/934,978 filed Sep. 3, 2004.

FIELD OF THE INVENTION

The present invention generally relates to gas-fired appliances that are intended for outdoor use and more particularly pertains to a venturi tube configuration for introducing primary combustion air into the flow of combustible gas upstream from the point of combustion.

BACKGROUND OF THE INVENTION

A number of gas-fired appliances such as barbecues, space heaters, lamps and the like are intended for outdoor use. Such devices may be plumbed directly into a natural gas supply line or alternatively, may be coupled to a replaceable propane tank or cylinder. In either configuration, gaseous fuel is conducted to the burner of the appliance and, at a point just upstream from the burner, is typically premixed with a sub-stoichiometric quantity of combustion air commonly referred to as primary combustion air. The mixture continues on through a conduit to the burner where additional combustion air combines with the mixture to achieve a stochiometric mixture to thereby provide for proper combustion.

Primary combustion air is typically drawn into a fuel stream by a venturi tube device, also commonly referred to as a mixing tube, wherein the flow of gas within the conduit is managed so as to reduce pressure below ambient and thereby cause air to be drawn into the gas stream through an exposed port. The venturi tube must be situated so as not to hinder the flow of fresh combustion air thereto. Similarly, a path for combustion air flow to the burner must also be kept open at all times in order to support complete combustion.

Outdoor type applications are problematic to the extent that gusting wind can extinguish the flame. In addition to the nuisance that is posed by having to repeatedly relight an appliance, a susceptibility to wind gusts is especially problematic in barbecue applications wherein the extinction of the flame may not be immediately apparent, should for example a cover be in place, and a delay in relighting the burner may have an adverse effect on the cooking process.

An improved gas burning apparatus is therefore needed that is less susceptible to wind gusts to thereby render such apparatus more useable during windy conditions. Barbecues for use in boating applications would be particularly well served by such an improvement as they are typically put to use while cantilevered over the side of the boat where they are especially exposed to gusts and are difficult to protect therefrom.

SUMMARY OF THE INVENTION

The present invention serves to overcome shortcomings of previously known gas-burning appliances to the extent that their susceptibility to wind gusts is greatly reduced. An appliance is thus more readily useable outdoors under a wider range of conditions, often obviating the need to make a special effort to protect the appliance from air currents altogether.

The improvement is based on the unexpected finding that the flame of a gas burning appliance is often extinguished by excessive or disjointed air flow over the primary air intake rather than by a direct disruption of the flame by such air flow in and around the burner. More particularly, it has been found that the speed and direction of air flowing over the venturi tube device can cause an increase or decrease in pressure at the intake orifice sufficient to affect the amount of primary air that is actually drawn into the flow of fuel. An oversupply or undersupply of primary air can create a stoichiometric condition that cannot be compensated for at the burner pursuant to which the flame goes out.

The device of the present invention comprises an improved venturi tube configuration that includes baffling that is arranged about its exterior that substantially reduces the effect of air flowing over the exterior of the device. The rate at which air is drawn into and mixed with fuel flowing through device remains substantially constant under a wide range of wind speeds and directions and variations thereof. More particularly, the baffling is arranged to force the primary air to follow a circuitous route to reach the intake orifice while sheltering a substantial volume of air within its interior. It is believed that the changes in direction that the baffling forces incoming air to undergo serves to reduce and stabilize the speed with which such airflow reaches the intake orifice while the volume of air that resides within the baffling serves to smooth out pressure gradients that impinging winds would otherwise subject the intake orifice to.

The baffling may be arranged in a number of different configurations about the exterior of the venturi tube. A preferred configuration includes a pair of overlapping tubes that are arranged so as to define a circuitous flowpath to the intake orifice by which the flow of air must undergo at least two 180° changes in direction to enter the flow of fuel within the device. While the tubes may be concentrically arranged, it has unexpectedly been found that a non-concentric arrangement does not have a detrimental effect on performance and may in fact serve to accommodate a wider range of wind conditions.

Other features and advantages of the invention will become apparent from the following detailed description, taken in conjunction with the accompanying drawings which illustrate, by way of example, the features of the invention

DETAILED DESCRIPTION OF THE PREFERRED EMBODIMENTS

The Figures generally illustrate preferred embodiments of the venturi tube, also referred to as a mixing tube, of the present invention. The venturi tube serves to introduce primary combustion air into the flow of combustible gas enroute from a fuel supply to a point of combustion such as the burner of a barbecue device. The tube configuration, and more particularly, the baffling arranged about the intake orifice serves to render the device substantially less susceptible to gusting wind.

Figure 1:
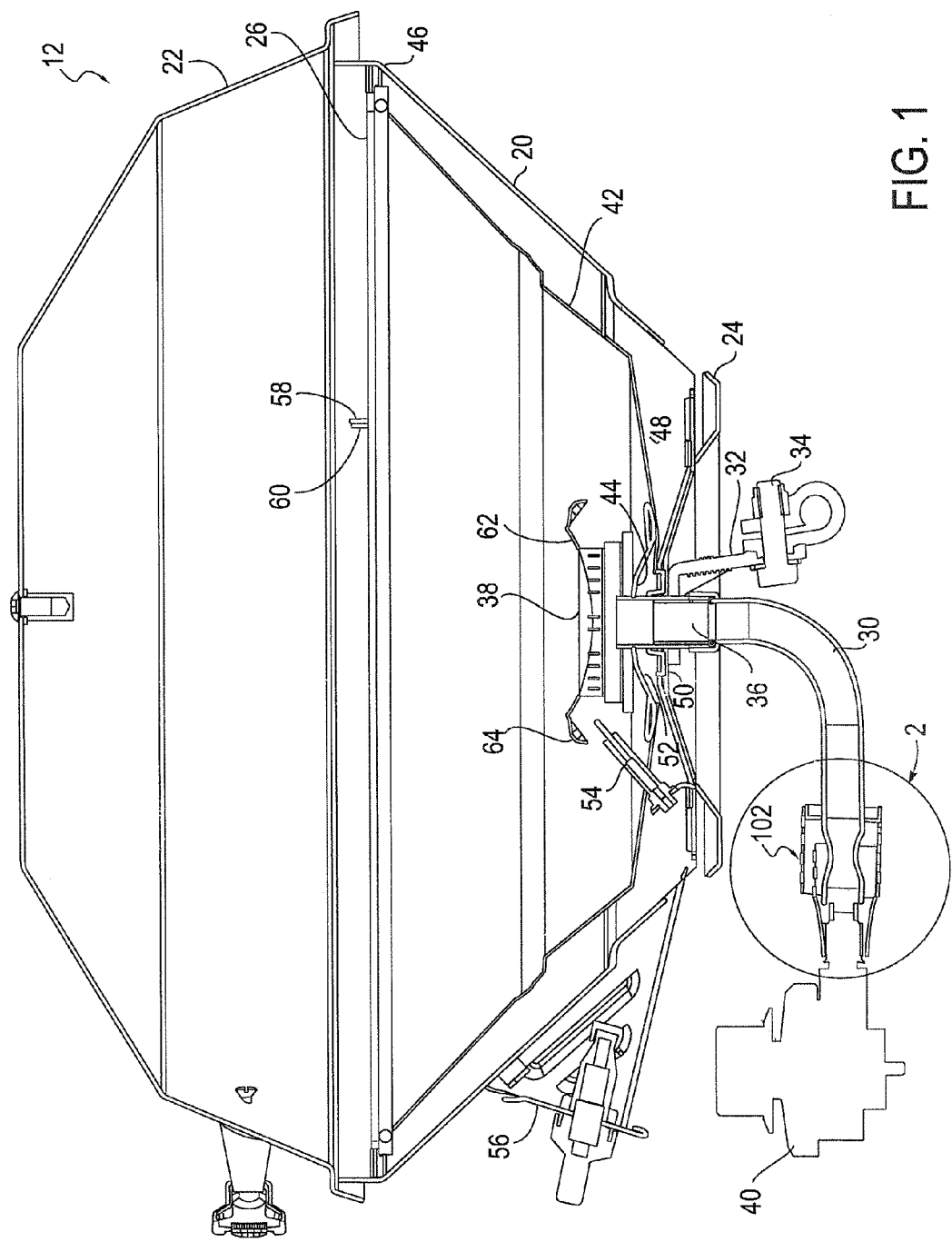
FIG. 1 is a cross-sectional view of a gas-fired cooking device with a venturi tube of the present invention attached thereto.

FIG. 1 is perspective view of a venturi tube 102 of the present invention adapted for use with a barbecue device 12. Combustible gas is conducted from a source 40 to a burner 38 via a conduit 30. The mixing venturi tube of the present invention is positioned in line with the conduit at a point upstream of the burner and in a well ventilated location in order to ensure that fresh air has unhindered access thereto. The need to position the venturi tube in a relatively open location is what often contributes to the susceptibility of such devices to gusting winds. A gust passing over the venturi tube can cause a sudden over-pressure or under-pressure which disrupts the amount of combustion air that enters the fuel stream which in turn may cause the flame to extinguish.

Figure 2:
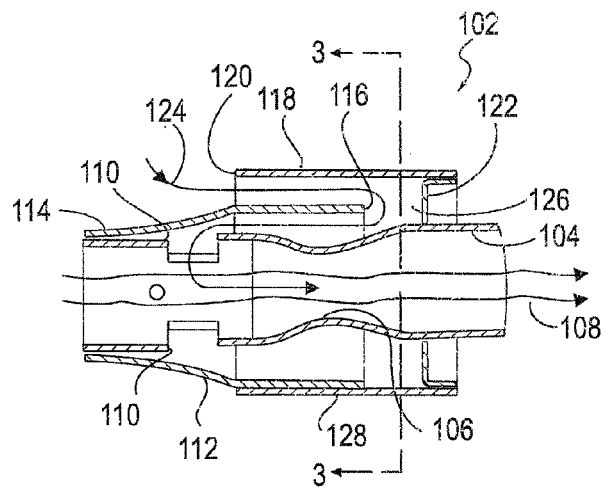
FIG. 2 is an enlarged view of circled region labeled "2" showing a preferred embodiment of the present invention in longitudinal cross-section.

FIG. 2 is an enlarged view of the circled region 2 of FIG. 1 showing the interior structure of the venturi tube 102 in longitudinal cross-section. The passage way 104 extending therethrough has a section 106 of restricted cross-section so as to cause the flow 108 of gaseous fuel there through to accelerate and create a zone of low pressure. One or more intake orifices 110 are formed in the wall of the passage way in a position so as to take advantage of the low pressure zone. An inner baffle 112 is disposed about the exterior of the passage way wherein the proximal end 114 of the inner baffle is closed off and positioned proximal to the intake orifices while its distal end 116 is open and positioned distal to the intake orifices. An outer baffle 118 of greater diameter is disposed about the exterior of the inner baffle. Its proximal end 120 is open and is positioned proximal to the distal end of the inner baffle while its distal end 122 is closed and is positioned distal to the open distal end of the inner baffle. A flowpath 124 is thereby defined that requires incoming primary combustion air to undergo at least two 180° changes in direction, one to reach the intake orifice and another to enter the stream of gaseous fuel 108. Additionally, a substantially volume 126 is enclosed within the baffling.

Figure 3:
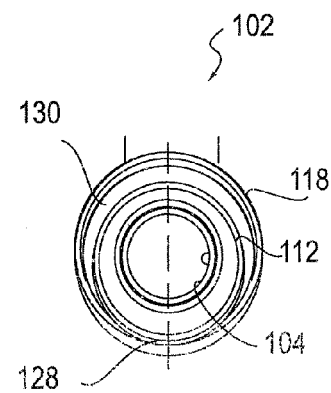
FIG. 3 is a transverse cross-sectional view taken along line 3-3 of FIG. 2.

FIG. 3 is a transverse cross-section taken along line 3-3 of FIG. 2 illustrating the non-concentric arrangement of the inner and outer baffles 112, 118 in this particular embodiment. The baffles are attached to one another at 128 so as to define an opening 130 of varying width extending about the circumference of the inner baffle.

Figure 4:
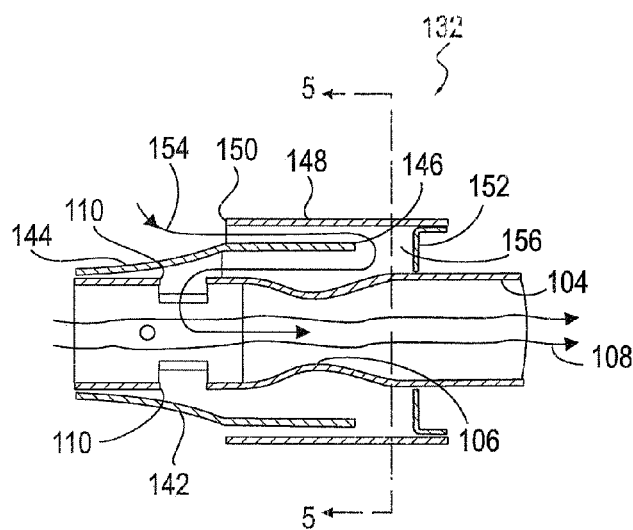
FIG. 4 is a longitudinal cross-section of alternative preferred embodiment of the present invention.

FIG. 4 is an enlarged view of a preferred alternative embodiment showing the interior structure of the venturi tube 132 in longitudinal cross-section. The passage way 104 extending therethrough has a section 106 of restricted cross-section so as to cause the flow 108 of gaseous fuel there through to accelerate and create a zone of low pressure. One or more intake orifices 110 are formed in the wall of the passage way in a position so as to take advantage of the low pressure zone. An inner baffle 142 is disposed about the exterior of the passage way wherein the proximal end 144 of the baffle is closed off and positioned proximal to the intake orifices while its distal end 146 is open and positioned distal to the intake orifices. An outer baffle 148 of greater diameter is disposed about the exterior of the inner baffle. Its proximal end 150 is open and is positioned proximal to the distal end of the inner baffle while its distal end 152 is closed off and is positioned distal to the open distal end of the inner baffle. A flowpath 154 is thereby defined that requires incoming primary combustion air to undergo at least two 180° changes in direction, one to reach the intake orifices and another to enter the stream of gaseous fuel 108. Additionally, a substantial volume 156 is enclosed within the baffling.

Figure 5:
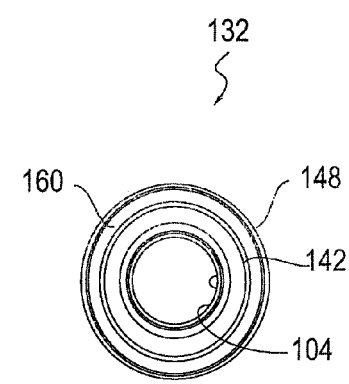
FIG. 5 is a transverse cross-sectional view taken along line 5-5 of FIG. 4.

FIG. 5 is a transverse cross-section taken along line 5-5 of FIG. 4 illustrating the concentric arrangement of the inner and outer baffles 142, 148 in this particular embodiment. The baffles cooperate to define an opening 160 of constant width extending about the circumference of the inner baffle.

In use, the venturi tube 102 of the present invention is inserted between a fuel supply and a burner. Gaseous fuel flowing 108 through the interior passageway 104 encounters a restriction 106 that induces a low pressure zone which in turn causes air to be drawn into the flow via intake orifices 110. The primary combustion air is drawn in from the exterior of the device into the fuel flow via a circuitous path 124, 154 as defined by the overlapping configuration of the baffles 112, 118 and 142, 148. The air flow makes a first 180° turn to enter the inner baffle 112, 142 and a second 180° turn to enter the gas stream. It is believed that the changes in direction and the relatively long flow path serves to stabilize the velocity with which the primary combustion air enters the fuel stream to thereby minimize the effect of wind blowing over the exterior of the device. Similarly, the volume 126, 156 of air within the device is believed to have a stabilizing influence on any pressure fluctuations the exterior of the device may be subjected to. It has also unexpectedly been found that the non-constant width of the opening 130 of the embodiment shown in FIGS. 1-3 seems to have a further stabilizing influence on the performance of the device, possibly preventing the formation of any standing waves or harmonics that may be created by air flowing over the device that could possibly have an adverse effect on the amount of primary combustion air entering the fuel stream.

While particular forms of the invention have been described and illustrated, it will also be apparent to those skilled in the art that various modifications can be made without departing from the spirit and scope of the invention. For example the size and shape of the baffles may be changed to accommodate particular applications. Additionally, more baffles may be added in order to require the incoming air to follow an even more circuitous route to the intake orifices. Accordingly, it is not intended that the invention be limited except by the appended claims.

What is claimed is:

1. A venturi tube for introducing primary combustion air into a flow of combustible gas upstream from a point of combustion, comprising:
   a conduit for conducting a flow of combustible gas from a source to a burner having an intake orifice formed therein for admitting combustion air into said flow of gas;
   a first baffle affixed to and about said conduit for blocking a direct path to said orifice; and
   a second baffle affixed to and about said conduit for forcing said primary combustion air to take a circuitous route to enter said flow of combustible gas, wherein said baffles are non-concentrically arranged relative one another.

2. The mixing venturi of claim 1, wherein said circuitous route includes at least two 180° turns and wherein said baffle.

3. The mixing venturi of claim 2, wherein said primary combustion air must make a 180° turn in flowing through said intake orifice.

4. The mixing venturi of claim 1, wherein said first and second baffles comprise tubular structures disposed about said intake orifice.

5. The mixing venturi of claim 4, wherein second baffle is disposed about said first baffle.

6. The mixing venturi of claim 5, wherein said first and second baffles are attached to one another.

7. The mixing venturi of claim 4, wherein said first baffle has a closed off proximal end and an open distal end, wherein said distal end is disposed distal to the intake orifice.

8. The mixing venturi of claim 7, wherein said second baffle has a closed off distal end and an open proximal end, wherein said proximal end is disposed proximal to the distal end of said first baffle.

* * * * *